US011650763B1

(12) United States Patent
Martin et al.

(10) Patent No.: US 11,650,763 B1
(45) Date of Patent: May 16, 2023

(54) DETERMINING POLICY REGIONS OF HIGH-SPEED MEMORY OF A STORAGE ENGINE

(71) Applicant: Dell Products, L.P., Hopkinton, MA (US)

(72) Inventors: Owen Martin, Hopedale, MA (US); Shaul Dar, Petach Tikva (IL); Paras Pandya, Anand (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/717,335

(22) Filed: Apr. 11, 2022

(51) Int. Cl.
*G06F 3/06* (2006.01)
*G06N 20/00* (2019.01)

(52) U.S. Cl.
CPC ............ *G06F 3/0659* (2013.01); *G06F 3/065* (2013.01); *G06F 3/067* (2013.01); *G06F 3/0613* (2013.01); *G06F 3/0631* (2013.01); *G06F 3/0656* (2013.01); *G06N 20/00* (2019.01)

(58) Field of Classification Search
USPC ................................................ 711/154, 161
See application file for complete search history.

(56) References Cited

U.S. PATENT DOCUMENTS

| | | | | |
|---|---|---|---|---|
| 10,365,977 | B1* | 7/2019 | Gould | G06F 11/2094 |
| 2013/0219144 | A1* | 8/2013 | Oe | G06F 3/0611 |
| | | | | 711/165 |
| 2014/0136456 | A1* | 5/2014 | Susarla | G06N 20/00 |
| | | | | 706/12 |
| 2021/0133134 | A1* | 5/2021 | Pinho | G06F 13/3625 |
| 2022/0342556 | A1* | 10/2022 | Dimnaku | G06F 3/067 |

* cited by examiner

*Primary Examiner* — Than Nguyen
(74) *Attorney, Agent, or Firm* — Anderson Gorecki LLP

(57) ABSTRACT

IO traces on a high-speed memory that provides temporary storage for multiple storage volumes are stored in a trace buffer. IO operations on different storage volume are considered separate workloads on the high-speed memory. Periodically, the IO traces are processed to extract workload features for each workload. The workload features are stored in a feature matrix, and the workload features from multiple IO trace buffer processing operations are aggregated over time. A HDBSCAN unsupervised clustering machine learning process is used to create a set of four workload clusters and an outlier cluster. A dominant feature of each workload cluster is used to set a policy for the workload cluster. IO percentages for clusters with the same policies are used to set minimum sizes for policy regions in the high-speed memory. Histograms based on the workloads are used to determine segmentation rules specifying slot sizes for the policy regions.

20 Claims, 14 Drawing Sheets

FIG. 4

I/O Trace Data Structure 400

| Storage Volume 405 | Timestamp 410 | Opcode 415 | LBA 420 | Transfer Length 425 |
|---|---|---|---|---|
| 5 | 1232.1 | 1 | 1211221 | 128k |
| 2 | 1233.9 | 3 | 126821 | 6k |
| 9 | 1234.7 | 2 | 1222221 | 15k |
| 223 | 1234.9 | 4 | 23552 | 64k |
| ⋮ | ⋮ | ⋮ | ⋮ | ⋮ |
| 44 | 1254.1 | 1 | 1158995 | 35k |

FIG. 5

Workload feature / policy table 500

| Feature Name | Feature Description | Mirror Policy |
|---|---|---|
| IOPS | IO per second over sample interval | NOP |
| Total Reads | Sum of read events | Unmirrored |
| Total Writes | Sum of write events | Mirror |
| Total Others (non-I/O) | Sum of all other events | NOP |
| Percentage reads (%) | % of read events | Unmirrored |
| Percentage writes (%) | % of write events | Mirror |
| Percentage others (%) | % of all other events | NOP |
| Average 'read' size | Average length of read IO | NOP |
| Average 'write' size | Average length of write IO | NOP |
| Std deviation of 'read' size | Standard deviation in read IO length | NOP |
| Std deviation of 'write' size | Standard deviation in write IO length | NOP |
| Time consecutive I/Os (avg) | Average interarrival rate of any IO | NOP |
| Time consecutive reads (avg) | Average interarrival rate of read IO | Unmirrored |
| Time consecutive writes (avg) | Average interarrival rate of write IO | Mirror |
| Delta consecutive I/Os (avg) | Average difference in LBA between all IOs | NOP |
| Delta consecutive reads (avg) | Average difference in LBA between read IOs | Unmirrored |
| Delta consecutive writes (avg) | Average difference in LBA between write IOs | Mirror |
| Consecutive read-read (%) | % of consecutive IO pairs that are both read | Unmirrored |
| Consecutive read-write (%) | % of consecutive IO pairs that are read followed by write | NOP |
| Consecutive write-read (%) | % of consecutive IO pairs that are write followed by read | NOP |
| Consecutive write-write (%) | % of consecutive IO pairs that are both write | Unmirrored |

FIG. 7

| Storage Volume 405 | Feature 1 (IOPS) | Feature 2 (Total Reads) | Feature 3 (Total Writes) | ... | Feature 21 (Consecutive write-write) |
|---|---|---|---|---|---|
| Workload 1 | Value 1-1 | Value 2-1 | Value 3-1 | ... | Value 21-1 |
| Workload 2 | Value 1-2 | Value 2-2 | Value 3-2 | ... | Value 21-2 |
| Workload 3 | Value 1-3 | Value 2-3 | Value 3-3 | ... | Value 21-3 |
| Workload 4 | Value 1-4 | Value 2-4 | Value 3-4 | ... | Value 21-4 |
| ... | ... | ... | ... | ... | ... |
| Workload n | Value 1-n | Value 2-n | Value 3-n | ... | Value 21-n |

Feature Matrix 700

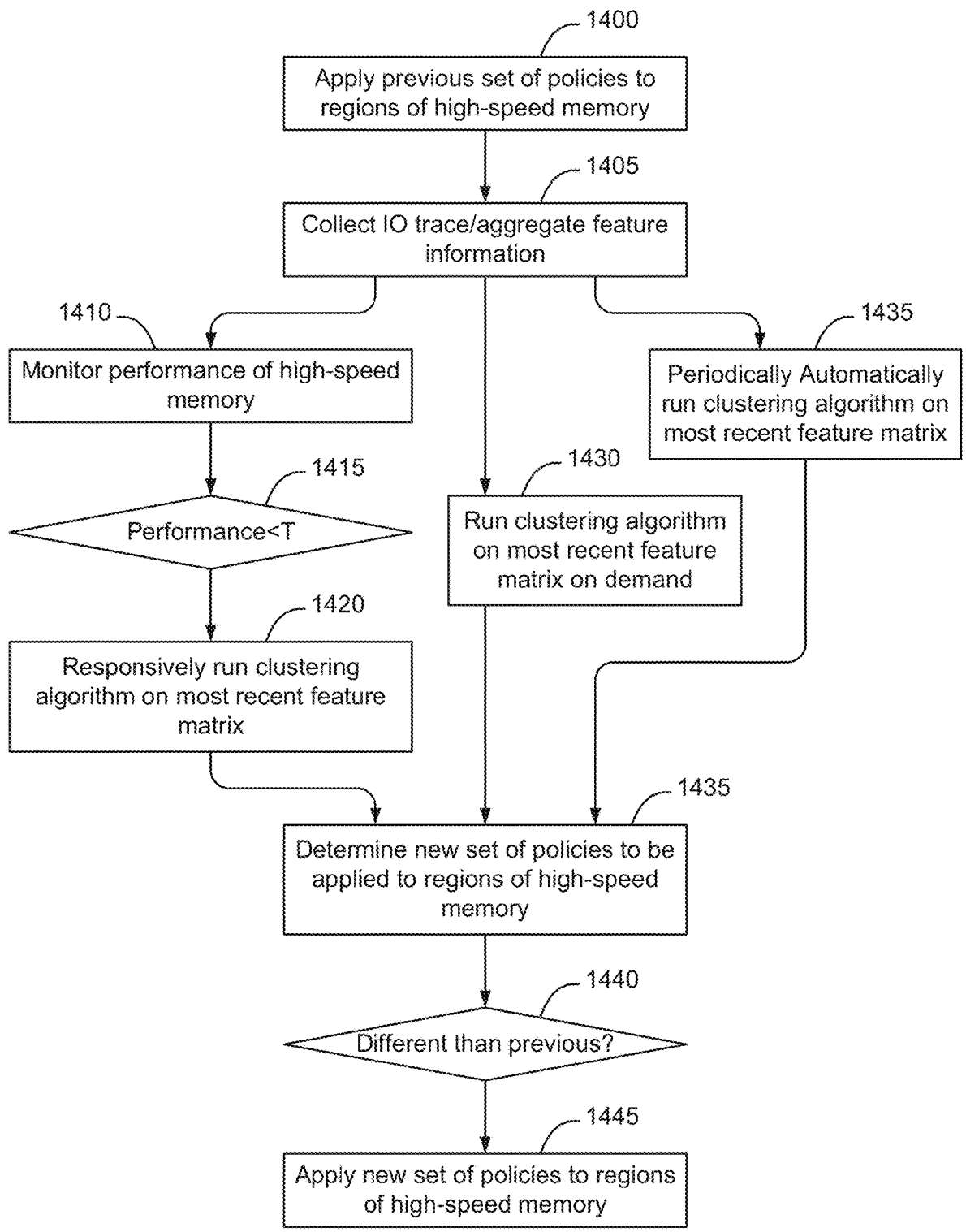

DETERMINING POLICY REGIONS OF HIGH-SPEED MEMORY OF A STORAGE ENGINE

FIELD

This disclosure relates to computing systems and related devices and methods and, more particularly, to a method and apparatus for optimizing use of high-speed memory of a storage region, by adjusting sizes of mirrored and unmirrored policy regions of the high-speed memory, and adjusting segmentation policies that are applied to the policy regions of the high-speed memory.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system has one or more storage engines, each of which has a pair of compute nodes. Each compute node has a high-speed memory, such as DRAM, that is used to temporarily store requested data in connection with performing read and write IO operations by the storage engine. Each high-speed memory has a plurality of regions, and each region is segmented into a plurality of slots. Slots of the high-speed memory are allocated to the read and write IOs as they are performed by the compute node. For example, in connection with a read IO by a host, the requested data is read into a slot of the high-speed memory of the compute node, and then read out to the host from the high-speed memory. In connection with a write IO by the host, the requested data is read into a slot of the high-speed memory of the compute node from the host, and then destaged (written) to back-end storage resources of the storage system by the compute node.

Storage provided by the storage system is organized in storage volumes. Different hosts access different storage volumes, although more than one host may access the same storage volume. The set of IO operations on a given storage volume accordingly represents a particular workload on the storage system. To optimize use of the high-speed memory of the compute node, IO traces associated with all operations on the high-speed memory are captured and entered into an IO trace buffer during a monitoring interval or until the trace buffer is full. The traces in the IO trace buffer are processed periodically, to identify workload features for workloads on each of the storage volumes. In some embodiments, 21 separate workload features are identified and the IO traces are processed to determine the 21 workload features based on IO traces of each of the storage volumes maintained by the storage system. The workload features are used to populate a feature matrix correlating workloads on storage volumes with workload features. IO traces for subsequent monitoring intervals are similarly processed to update the feature matrix over a workload analysis time period.

At the end of the workload analysis time period or at another suitable time, an unsupervised clustering machine learning process is used to cluster the workloads summarized in the feature matrix to create a set of workload clusters. In some embodiments an Hierarchical Density-Based Spatial Clustering of Applications with Noise (HDB-SCAN) unsupervised clustering machine learning process is used to identify four workload clusters, and a $5^{th}$ cluster is created based on the workload outliers. The unsupervised clustering machine learning process also identifies the dominant feature of each workload cluster as well as the total number of IOPS associated with the workload cluster.

The dominant feature of each workload cluster is used to specify a policy for the workload cluster. The total number of IOPS for the workload cluster is used to identify a relative percentage of IOPS associated with the workload cluster policy. The percentage of IOPS is aggregated for all clusters with the same policy, and the aggregated per policy IOPS percentages are used to specify minimum sizes of policy regions on the high-speed memory, wherein a given policy (mirrored or unmirrored) is applied on a given policy region of the high-speed memory.

A histogram of IO sizes is created for each of the policy regions, by looking at the IO sizes of the IO operations on the workloads that were mapped to clusters associated with the policy. The histograms are used to perform dynamic segmentation size adjustment of slots within the respective policy regions.

By dynamically changing the size of the policy regions of the high-speed memory, and dynamically adjusting the segmentation size of the slots of the policy regions of high-speed memory, it is possible to greatly increase the number of slots that are able to be created within the high-speed memory, when compared with application of a fixed set of policy regions to the high-speed memories of the pairs of compute nodes of the storage engine. Likewise, enabling dynamic segmentation size adjustment further optimizes the number of slots available for use in connection with IO processing on the compute nodes, when compared with application of a fixed sized segmentation of the policy regions of high-speed memory. This enables the high-speed memory to hold a larger number of items, thereby improving performance of the storage system. Alternatively, a smaller amount of high-speed memory may be used to store the same number of items, thereby reducing the cost of the storage system while enabling comparable or even better performance.

BRIEF DESCRIPTION OF THE DRAWINGS

FIG. 4 is a functional block diagram of an IO trace data structure, according to some embodiments.

FIG. 5 is a functional block diagram of an example workload feature/policy table, according to some embodiments.

FIG. 7 is a functional block diagram of a feature matrix data structure created from the control logic of FIG. 6, according to some embodiments.

FIG. 14 is a flow chart of example control logic configured to periodically determine a new set of policies to be applied to regions of high-speed memory, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
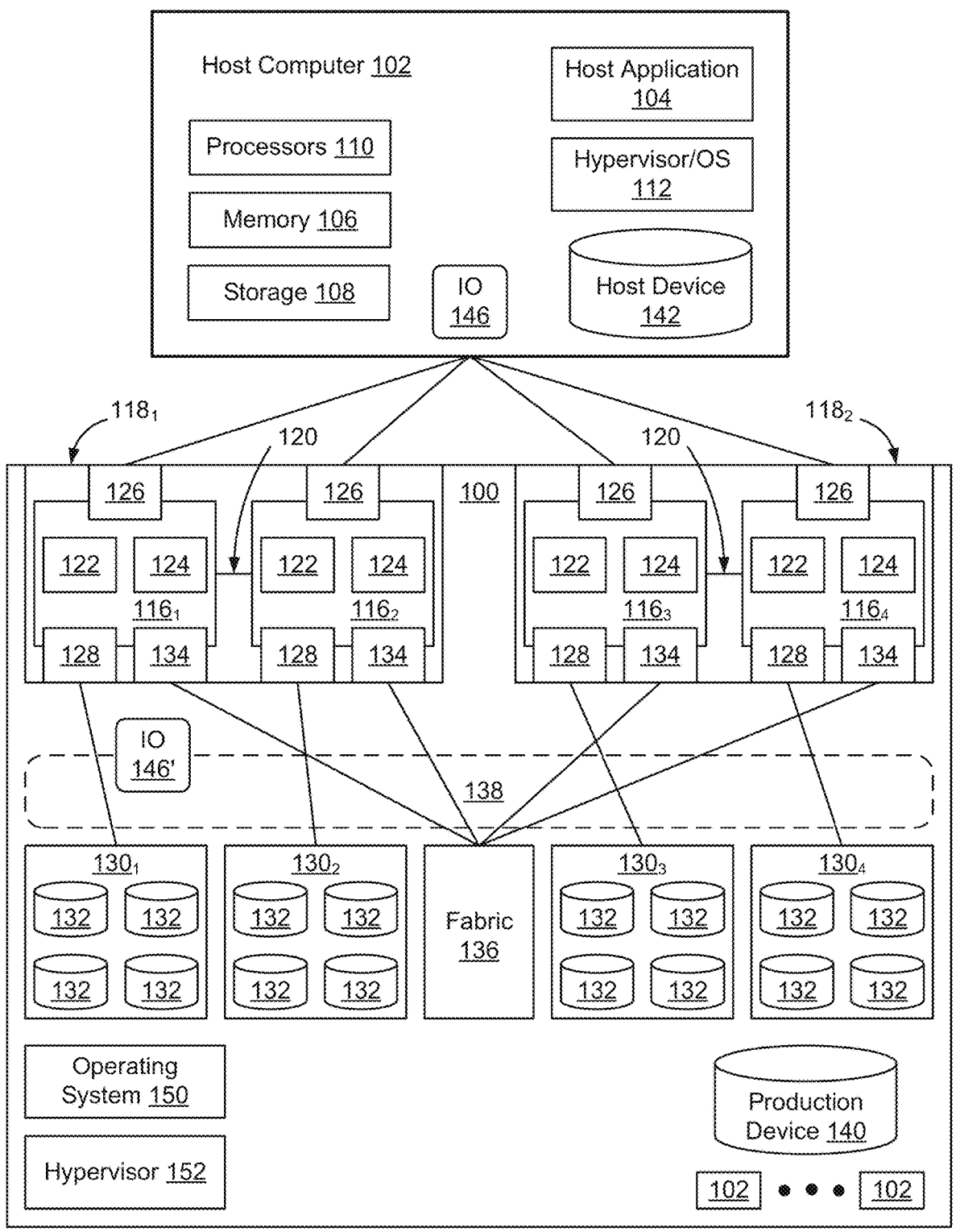
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile high-speed memory 124. The processors 122 may include a plurality of multi-core processors of one or more types, e.g., including multiple CPUs, GPUs, and combinations thereof. The local volatile memory 124 may include, for example and without limitation, any type of RAM. In some embodiments, the local volatile memory is implemented using Dynamic Random Access Memory (DRAM) or another high-speed volatile memory technology. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). In some embodiments, the shared local memory is implemented as a high-speed memory using a technology such as DRAM.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

In some storage system architectures, any time an IO is processed by a storage engine 118, the storage engine 118 first copies the requested data into high-speed memory 124. The storage engine 118 then either reads the requested data out from high-speed memory 124 to the host 102 (in connection with a read IO), or writes (destages) the requested data out to back-end storage resources 132 (in connection with a write IO). The number of slots of high-speed memory 124 therefore limits the number of IO operations that a given compute storage engine can implement in a given time period.

Figure 2:
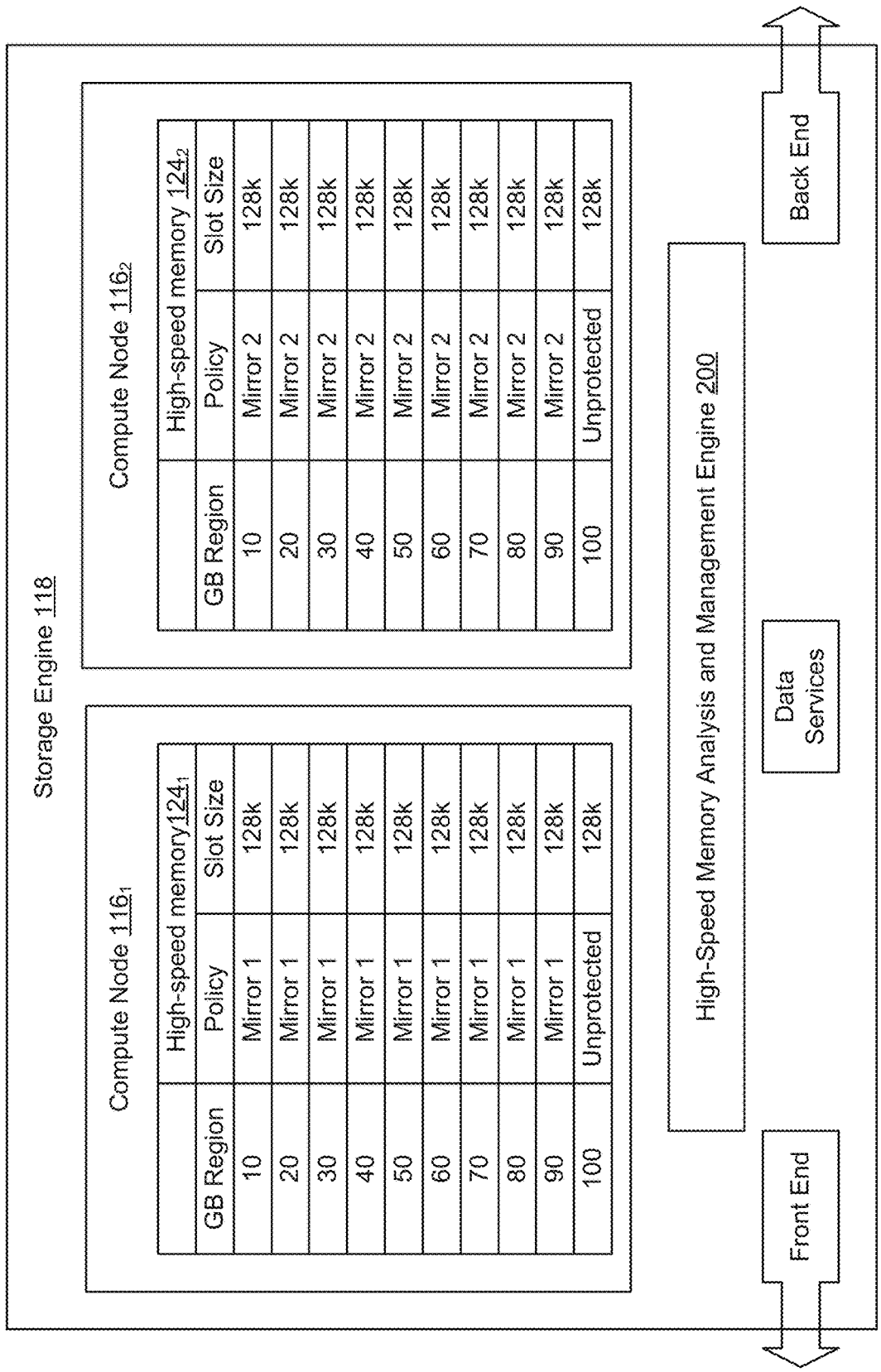
FIG. 2 is a functional block diagram of a storage engine having a pair of compute nodes with high-speed memory, and a high-speed memory analysis and management engine, according to some embodiments.

FIG. 2 is a functional block diagram of a storage engine having a pair of compute nodes and a high-speed memory analysis and management engine 200, according to some embodiments. As shown in FIG. 2, in some embodiments the storage engine 118 has a pair of two compute nodes 116. Having a pair of two compute nodes 116 provides redundancy within storage engine 118, such that if one of the two compute nodes 116 experiences failure, the other compute node 116 should be able to complete the requested IO operation.

When a write IO is received by the storage engine 118 from a host 102, the write IO contains data that is not otherwise stored on the storage system 100. Accordingly, in some embodiments the compute nodes $116_1$, $116_2$, implement a mirrored policy on a portion of each compute nodes' high-speed memory 124, which results in the same data being written to both the high-speed memory $124_1$ of compute node $116_1$, and to high-speed memory $124_2$ of compute node $116_2$. This provides redundant copies of the data associated with a write IO such that, if one of the compute nodes fails, the other compute node can destage the data associated with the write IO to back-end storage resources. Implementing a mirror policy on regions of the high-speed memory 124 is therefore important in connection with processing write IOs by the storage engine 118.

When a read IO is received by the storage engine 118 from a host 102, the read IO requests data that is already stored on the storage system. Accordingly, when the read IO is processed by one of the compute nodes 116, the data does not need to be placed in a mirrored region of high-speed memory 124, since a backup copy of the data continues to reside in back-end storage resources 130. By applying an unmirrored policy to a portion of the regions of high-speed memory 124 it is therefore possible to increase the number of slots of high-speed memory 124 that are available to process IO operations on the storage engine 118.

As used herein, the term "policy region" refers to a region of the high-speed memory 124 where a particular policy (mirrored or unmirrored) is applied. A given region of the high-speed memory will either have a "mirrored" policy applied to it or an "unmirrored" policy applied to it. Within a given policy region, segmentation is used to define the size of slots of memory (chunk sizes). A given policy region may be configured to allocate slots of different sizes, depending on the segmentation configuration of the policy region.

Different workloads have different characteristics, and determining the correct sizes of the policy regions and segmentation configurations to apply to the high-speed memories 124 of the compute nodes is not trivial. Often the high-speed memory 124 of the compute nodes 116 is configured to have a default-sized policy regions, such as a first region (e.g. 70% of high-speed memory) on which a mirrored policy is applied, and a second region (e.g. 30% of high-speed memory) on which an unmirrored policy is applied.

Figure 3:
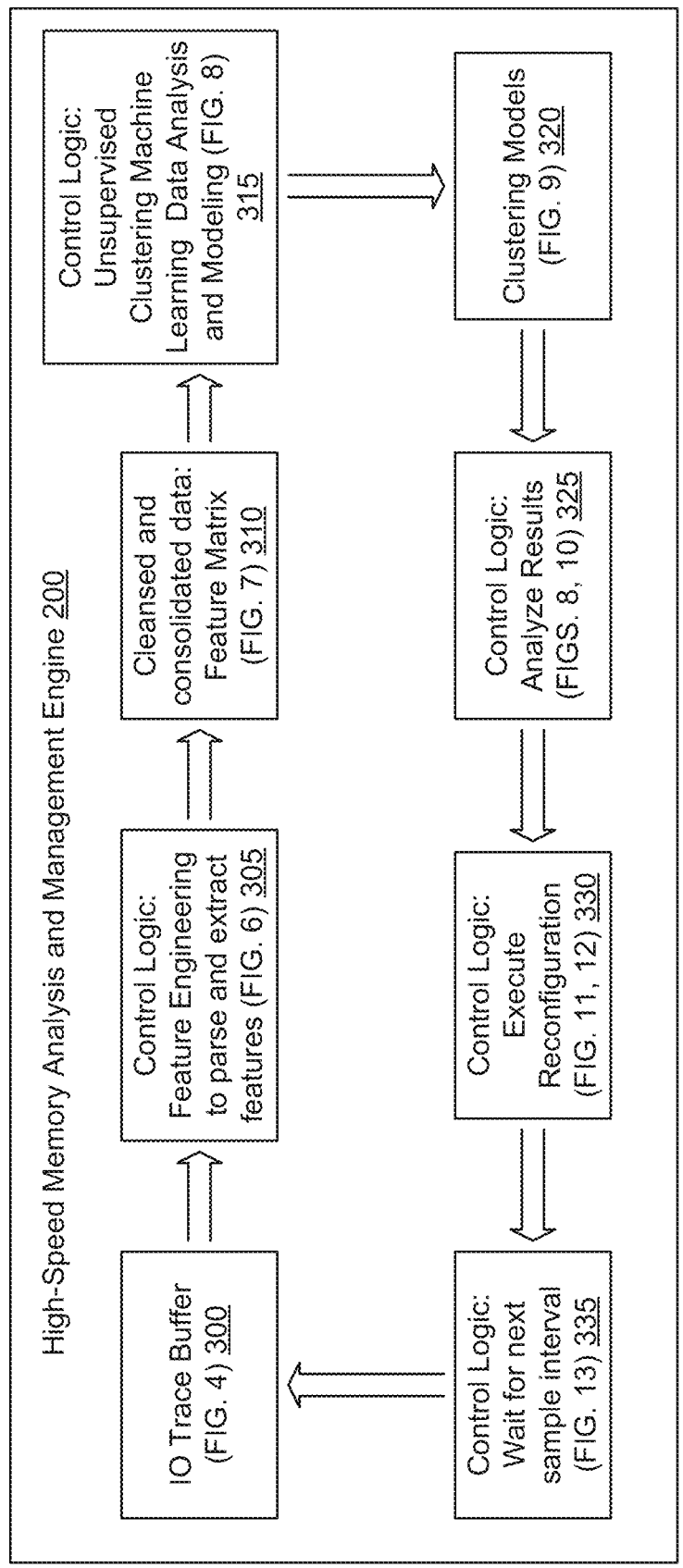
FIG. 3 is a functional block diagram of an example high-speed memory analysis and management engine, according to some embodiments.

According to some embodiments, storage engine 118 includes a high-speed memory analysis and management engine 200 configured to analyze workloads on the storage engine 118, determine the size of the policy regions of the high-speed memory, and determine slot size allocation distributions within the policy regions. Although FIG. 3 shows the high-speed memory analysis and management engine 200 as implemented as part of the storage engine 118, it should be understood that the high-speed memory analysis and management engine 200 may be implemented in one of the compute nodes 116, in another component of storage system 100, or external to storage system 100.

Storage provided by the storage system is organized in storage volumes. Different hosts access different storage volumes, although more than one host may access the same storage volume. The set of IO operations on a given storage volume accordingly represents a particular workload on the storage system. To optimize use of the high-speed memory of the compute node, IO traces associated with all operations on the high-speed memory are captured and entered into an IO trace buffer during a monitoring interval or until the trace buffer is full. The traces in the IO trace buffer are processed periodically, to identify workload features for workloads on each of the storage volumes. In some embodiments, 21 separate workload features are identified and the IO traces are processed to determine the 21 workload features for each of the storage volumes maintained by the storage system. The workload features are used to populate a feature matrix, in which each row represents one of the storage volumes and each of the columns represents one of the workload features. IO traces for subsequent monitoring intervals are similarly processed to update the feature matrix over a workload analysis time period.

At the end of the workload analysis time period, an unsupervised clustering machine learning process is used to cluster the workloads summarized in the feature matrix to create a set of workload clusters. In some embodiments an Hierarchical Density-Based Spatial Clustering of Applications with Noise (HDBSCAN) unsupervised clustering machine learning process is used to identify the four workload clusters, and a $5^{th}$ cluster is created based on the workload outliers. The unsupervised clustering machine learning process also identifies the dominant feature of each workload cluster as well as the total number of IOPS associated with the workload cluster.

The dominant feature of each workload cluster is used to specify a policy for the workload cluster. The total number of IOPS for the workload cluster is used to identify a relative percentage of IOPS associated with the workload cluster policy. The percentage of IOPS is aggregated for all clusters with the same policy, and the aggregated per policy IOPS percentages are used to set the minimum sizes of the policy regions on the high-speed memory, wherein a given policy is applied on a given policy region of the high-speed memory.

A histogram of IO sizes is created for from the workload clusters associated with the policy regions, by looking at the IO sizes of all IO operations on the workload clusters associated with the respective policy. The histograms are used to perform dynamic segmentation size adjustment of slots within the policy regions.

By dynamically changing the size of the policy regions of the high-speed memory, and dynamically adjusting the segmentation size of the slots of the policy regions of high-speed memory, it is possible to greatly increase the number of slots that are able to be created within the high-speed memory, when compared with application of a fixed policy to the high-speed memories of the pairs of compute nodes of the storage engine. Likewise, enabling dynamic segmentation size adjustment further optimizes the number of slots available for use in connection with IO processing on the compute nodes, when compared with application of a fixed sized segmentation of the regions of high-speed memory. This enables the high-speed memory to hold a larger number of items, thereby improving performance of the storage system. Alternatively, a smaller amount of high-speed memory may be used to store the same number of items, thereby reducing the cost of the storage system while enabling comparable or even better performance.

FIG. 3 is a functional block diagram of an example high-speed memory analysis and management engine 200, according to some embodiments. As shown in FIG. 3, in some embodiments the high-speed memory analysis and management engine 200 includes an IO/Trace buffer 300. Every IO operation on the storage engine 118 is captured and used to create an entry in an IO trace data structure of the IO trace buffer 300.

FIG. 4 is a functional block diagram of an example IO trace data structure that may be used to implement the IO trace buffer 300, according to some embodiments. As shown in FIG. 4, in some embodiments the IO trace data structure 400 includes a set of entries, in which each entry represents a particular IO operation on the storage engine. The entries, in FIG. 4, are the rows of the IO trace data structure. Each entry contains various pieces of information that are used to characterize the IO trace. For example, the entries may identify the storage volume 405 on which the IO operation occurred, the timestamp 410 of the IO operation, the Opcode 415 (type of IO operation), the Logical Block Address (LBA) 420 of the IO operation, the transfer length 425 representing the size of the IO operation, and multiple other aspects that describe particular features of the IO operation. The IO trace data structure only contains metadata describing the IO operation, however, and does not contain the actual data requested by the IO operation or the data provided in connection with the IO operation. Although the IO trace data structure 400 is shown in FIG. 4 as being implemented as a table, other data structure formats or databases may be used as well, depending on the implementation.

The IO trace buffer 300 has a finite size. When the IO trace buffer reaches capacity, or a threshold of its capacity, feature engineering control logic 305 is used to implement feature engineering on the data contained in the IO trace data structure 400. Specifically, the control logic is used to parse the data contained in the IO trace data structure and extract features from the data. Example control logic is described in connection with FIG. 6. An example of the cleansed and consolidated data created by the feature engineering control logic 305 is described in connection with FIG. 7.

FIG. 5 is a functional block diagram of an example workload feature/policy table 500, according to some embodiments. As shown in FIG. 5, there are many ways to characterize workloads that are being implemented by the storage engine 118. The example workload feature/policy table 500 shown in FIG. 5 includes 21 features that may be extracted from the IO traces of the IO trace data structure. Example features may include the total number of IO operations per second on the storage volume over the sampling interval, the total number of read events, the total number of write events, etc. According to some embodiments, the feature engineering control logic 305 analyzes the IO traces contained in the IO trace data structure to identify, on a per-storage volume basis, the features associated with the workload on the storage volume during the monitoring interval for which IO traces are contained in the IO trace data structure.

Figure 6:
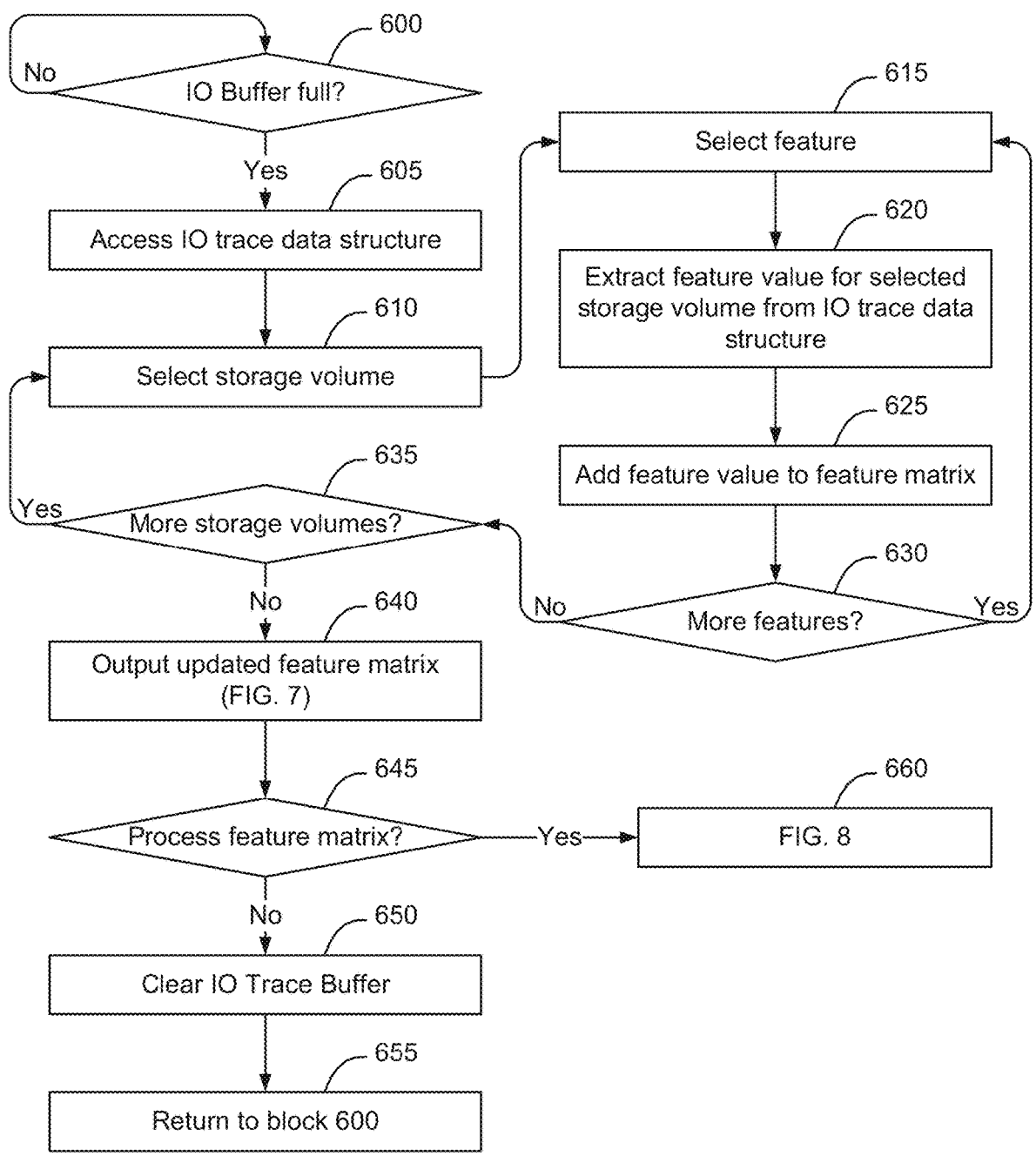
FIG. 6 is a flow chart of example control logic configured to implement feature engineering on the data contained in the IO trace buffer, according to some embodiments.

FIG. 6 is a flow chart of example feature engineering control logic configured to implement feature engineering on the data contained in the IO trace buffer 300, according to some embodiments. As shown in FIG. 6, in some embodiments the feature engineering control logic 305 monitors the IO trace buffer to determine if the IO trace buffer is full or close to full (block 600). Alternatively, the feature engineering control logic 305 might determine to process the traces in the IO trace buffer 300 based on another external event, such as on the passage of a particular threshold amount of time. Depending on the size of the IO trace buffer and the amount of workload on the storage engine 118, it may take on the order of one to two hours for the IO trace buffer to fill (a determination of YES at block 600).

When the IO trace buffer is sufficiently full (a determination of YES at block 600) the feature engineering control logic 305 accesses the IO trace data structure 605 and processes the IO traces to determine features of the workloads on the storage volumes during the monitoring period. In some embodiments, IO operations on a particular storage volume represent a particular workload on the storage engine 118. By processing IO traces on the storage volume, it is possible to characterize the workload on the storage system by determining values of workload features, such as the workload features listed in the workload feature/policy table of FIG. 5.

As shown in FIG. 6, the feature engineering control logic 305 selects a first storage volume (block 610) and feature (block 615) such as the number of write IOs, and processes the traces contained in the IO trace data structure to determine the value of the feature for the selected storage volume from the IO trace data structure 400 (block 620). The determined value of the first feature is added to a feature matrix for the workload (block 625). An example feature matrix is shown in FIG. 7.

The feature engineering control logic 305 then determines if there are additional features to be processed for the workload associated with the selected storage volume (block 630). If there are additional features (a determination of YES at block 630), a subsequent feature is selected and the process returns to block 615. If there are no additional features (a determination of NO at block 630), the feature engineering control logic 305 returns to block 635 to determine if there are additional storage volumes to be processed. The process iterates until all storage volumes and all storage volumes have been processed (a determination of NO at block 635). Although FIG. 6 has shown the feature engineering control logic 305 processing storage volumes serially, it should be understood that the feature engineering control logic 305 may process all or some of the storage volumes in parallel depending on the implementation. Likewise, although FIG. 6 shows the feature engineering control logic 305 processing features serially, it should be understood that the feature engineering control logic 305 may process all or some of the features in parallel, depending on the implementation.

FIG. 7 is a functional block diagram of an example feature matrix data structure created from the feature engineering control logic 305 of FIG. 6, according to some embodiments. As shown in FIG. 7, in some embodiments the feature engineering control logic 305 creates a feature matrix describing workloads on the storage system according to feature values derived from the IO traces of the IO trace data structure 400. In the data structure shown in FIG. 7, each row corresponds to a workload on a particular storage volume, and each column corresponds to a feature of the workload. Thus, the value 1-1 is the value of feature 1 on workload 1. The value 2-3 is the value of feature 2 on workload 3. Each row of the feature matrix 700, therefore, represents a workload on a particular storage volume, and the values in the columns are the values of the features that characterize that particular workload on the storage system.

Once the feature engineering control logic 305 processes the IO traces of the IO trace data structure, the IO trace data structure is reset (block 650) and the process returns to block 600 to continue collecting IO trace data into the IO trace buffer (block 655). The process shown in FIG. 6 might iteratively process IO traces from the IO trace data structure multiple times, each time adding the feature values for the workloads to the feature matrix, to incrementally build the feature values over time. For example, the feature engineering control logic 305 might build a feature matrix over a 24 hour period. If the IO trace buffer is able to hold one or one and a half hours of IO traces, that would mean that the feature engineering control logic 305 would process IO traces from the IO trace data structure on the order of 18-24 times to incrementally aggregate features to build a feature matrix representing workloads on the storage engine over the 24 hour period. Once the feature matrix is built, it is analyzed using an unsupervised clustering machine learning process (block 645), an example of which is described in connection with FIG. 8.

Although an implementation of the feature matrix is shown in FIG. 7, in which workload features for multiple IO trace buffers are aggregated into the feature matrix, in some embodiments a separate feature matrix is formed each time the IO trace buffer is processed, and multiple feature matrixes are stored over time. If a decision is made to run the unsupervised clustering machine learning process to analyze workload over an analysis period, a previous set of feature matrixes that were created during the analysis period are obtained and the workload features from the multiple feature matrixes are aggregated to form a final aggregated feature matrix. For example, if the content of the IO trace buffer is processed every hour, 24 individual feature matrixes would be created each day and stored. If, on day six, a decision was made to perform a clustering analysis, and that the workload clustering analysis should be based on the previous 36 hours of workload on the storage engine, the preceding 36 hourly feature matrixes would be selected, the workload from the feature matrixes would be aggregated on a per-storage volume basis, to thereby create the final aggregated feature matrix, to be used in the workload clustering analysis described herein. Thus, there are many ways of creating the feature matrix depending on the implementation.

Figure 8:
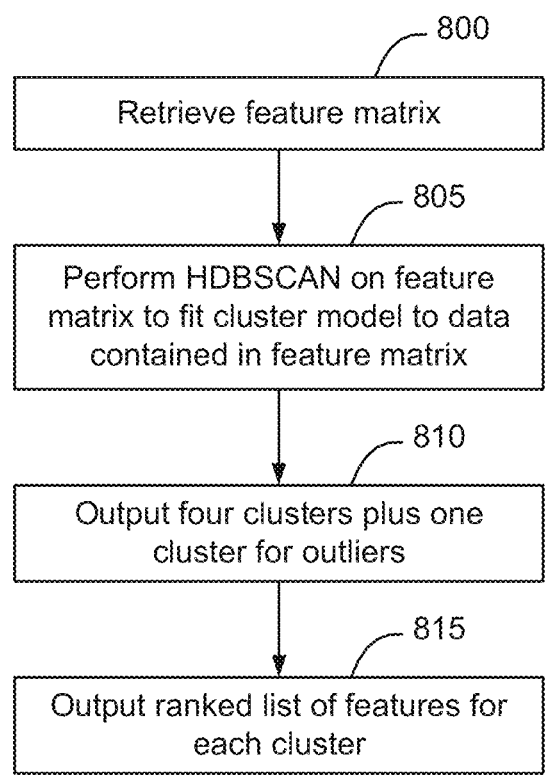
FIG. 8 is a flow chart of example control logic configured use an unsupervised clustering machine learning process to determine a set of workload clusters from the data contained in the feature matrix of FIG. 7, according to some embodiments.

FIG. 8 is a flow chart of example control logic configured use an unsupervised clustering machine learning process to determine a set of workload clusters from the data contained in the feature matrix of FIG. 7, according to some embodiments. As shown in FIG. 8, in some embodiments, after a feature matrix has been built, the feature matrix is retrieved (block 800) and an unsupervised clustering machine learning process is used to cluster the workloads (rows) of the feature matrix to fit a cluster model to the data contained in the feature matrix (block 805). In some embodiments, a Hierarchical Density-Based Spatial Clustering of Applications with Noise (HDBSCAN) application is used to identify four clusters based on the workload features from the feature matrix, and a fifth workload cluster is formed from the outliers of the four identified clusters (block 810). The output of the unsupervised clustering machine learning process includes an identity of each of the workload clusters, as well as a ranked list of the features for each cluster (block 815). By causing the unsupervised clustering machine learning process to output a ranked list of the features associated with the workloads that were grouped into the workload clusters, it is possible to identify the dominant features of the workloads that are grouped into each of the workload clusters.

Although some embodiments will be described in which the unsupervised clustering machine learning process is a HDBSCAN process, other unsupervised clustering machine learning processes that might be used, include k-means and DBSCAN, depending on the implementation. K-means unsupervised clustering machine learning process is a centroid based process, whereas DBSCAN and HDBSCAN are both density-based algorithms. In an experimental validation, it was determined that it was possible to achieve similar results with these different algorithms, which validates the selection of the use of HDBSCAN as a preferred unsupervised clustering machine learning process to be used to create workload clusters based on workload features contained in the feature matrix.

The elbow method, plus silhouette score, was used to select a correct number of workload clusters, which experimentally indicated that four workload clusters plus an outlier workload cluster provided sufficient granularity to set the policies to regions of the high-speed memory 124. The elbow method, for example in connection with a K-means algorithm, plots "K" values against the sum of squared error (SSE). The optimal K is identified when the drop in SSEs starts to flatten. Experimentally, this was determined to occur around 6 or 7 clusters for the K-means algorithm. The silhouette score [−1,+1] is calculated for both inter-cluster and intra-cluster distances. The number of workload clusters is then chosen that maximizes the score. With K-means the number of workload clusters was determined to be six. With DBSCAN it was four, and with HDBSCAN the optimal number of workload clusters was 5. K-means has no definition of outliers, whereas DBSCAN and HDBSCAN do. Combining these methods, it was determined that four clusters plus one cluster for outliers would be sufficient to represent the workloads contained in the feature matrix 700.

In some embodiments, once the number of workload clusters has been selected, the unsupervised clustering machine learning process is always used to create the selected number of workload clusters each time the data contained in the feature matrix is updated and processed, to limit the number of runtime permutations the solution can generate.

Figure 9:
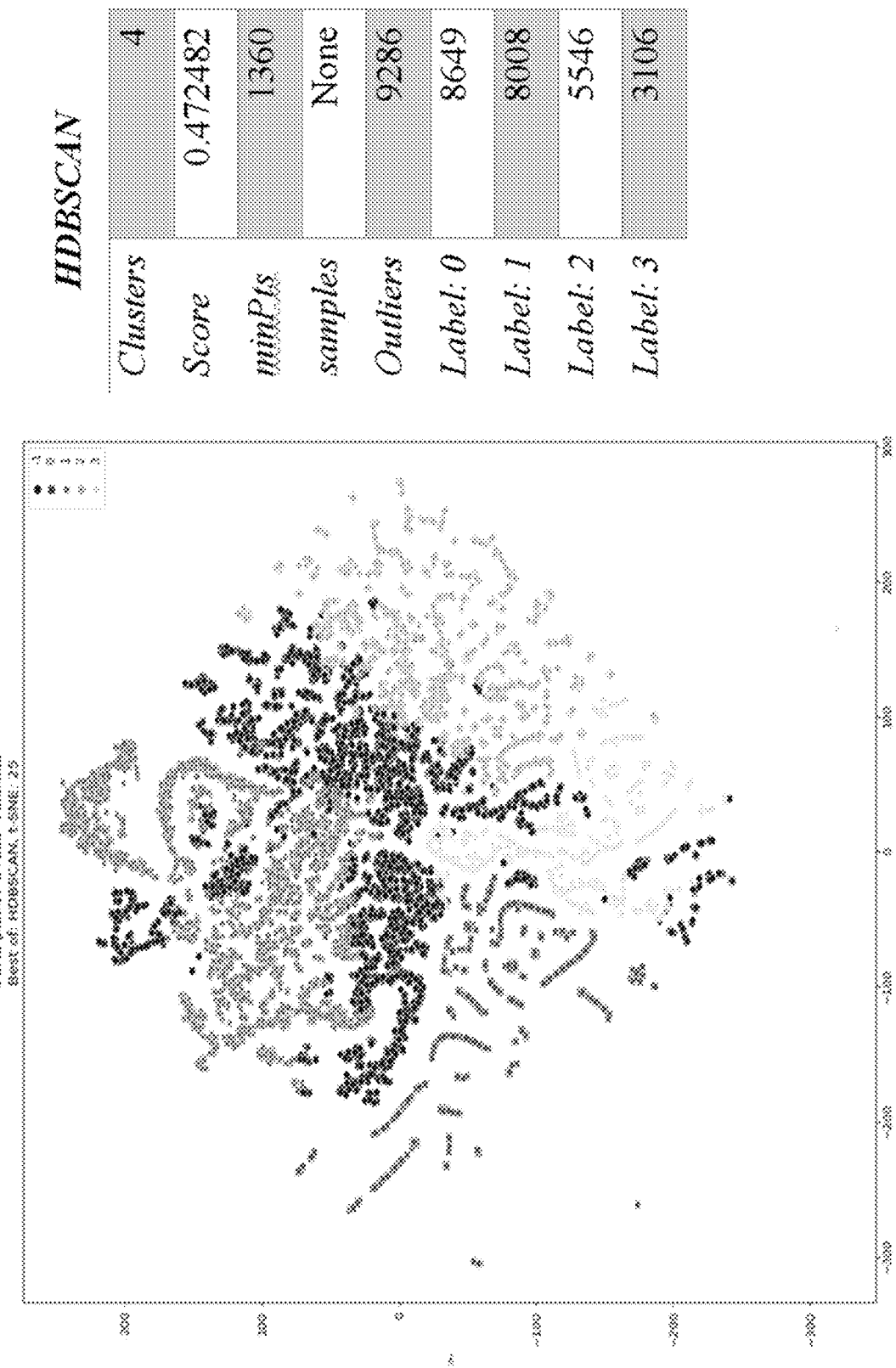
FIG. 9 is a graph showing a visualization of an example output the unsupervised clustering machine learning process of FIG. 8 showing four clusters plus one outlier cluster, according to some embodiments.

Once the number of workload clusters is selected, subroutines in Python can be used to fit a HDBSCAN model to the data contained in the feature matrix to create the selected number of workload clusters. FIG. 9 shows an example visualization of an output of an HDBSCAN unsupervised clustering machine learning process that was illustrated using t-SNE (t-distributed Stochastic Neighbor Embedding). In particular, FIG. 9 is a graph showing an example output the unsupervised learning process of FIG. 8 showing four clusters plus one outlier cluster, according to some embodiments.

Figure 10:
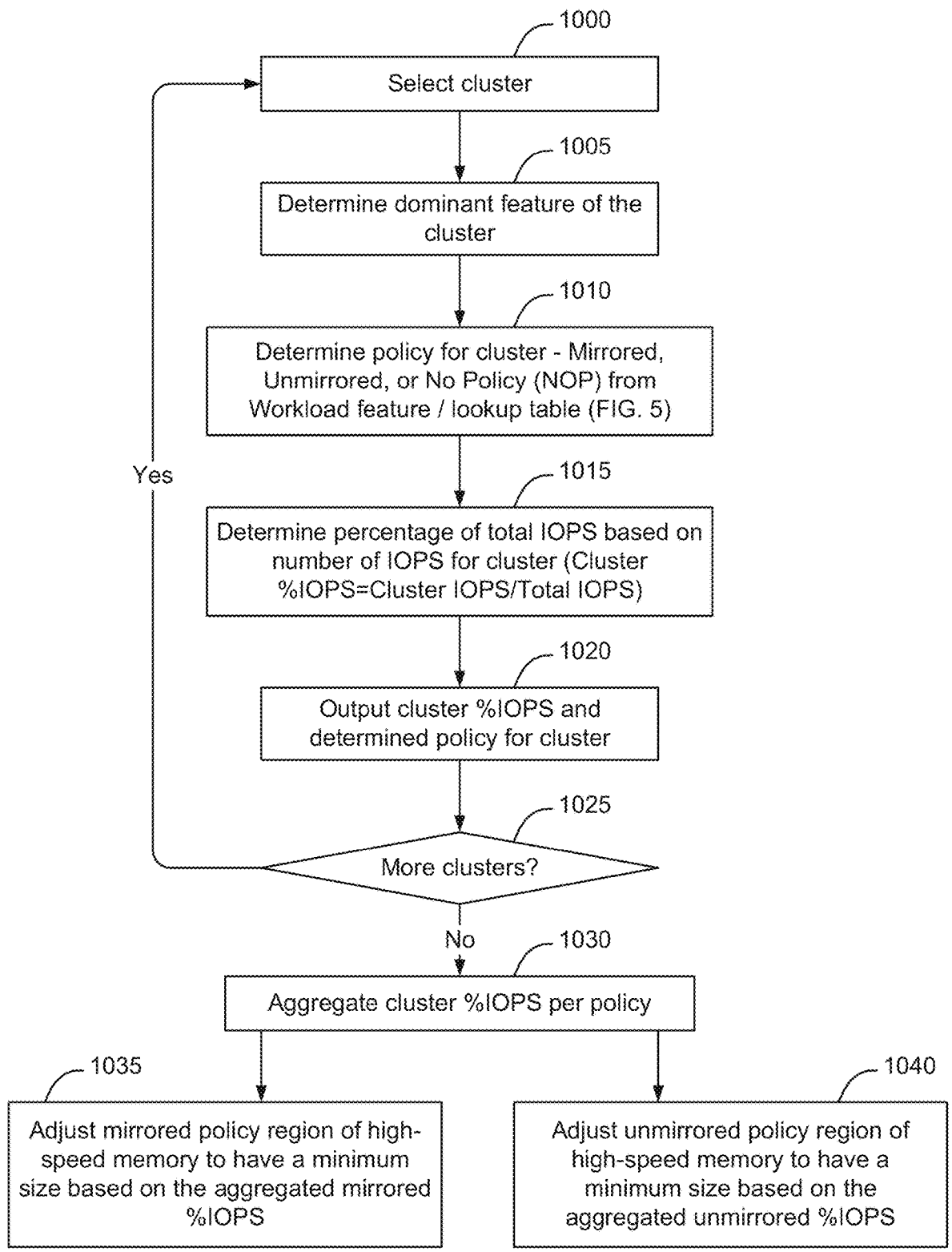
FIG. 10 is a flow chart of example control logic configured to use the workload clusters identified by the unsupervised learning process to adjust the size of policy regions of the high-speed memory, according to some embodiments.

FIG. 10 is a flow chart of example control logic configured to use the workload clusters identified by the unsupervised learning process to adjust the size of policy regions of the high-speed memory, according to some embodiments. As shown in FIG. 10, a cluster is selected (block 1000) and the dominant feature of the workload cluster is determined (block 1005). Example features are shown in FIG. 5, which includes both the feature name (left column) and the feature description (middle column). As noted above, in connection with creating the features, the unsupervised clustering machine learning process also outputs a ranked list of features that were dominant in forming the workload cluster. In some embodiments, the most dominant feature that was determined by the unsupervised clustering machine learning process in connection with forming the workload cluster is used as the "dominant" feature of the workload cluster. In some embodiments, if two features are almost equally dominant, the two features are selected as being the "dominant" feature of the workload cluster.

Based on the determined dominant feature, a policy is determined for the workload cluster (block 1010). The determined policy may be mirrored, in which slots of high-speed memory $124_1$, $124_2$, are replicated (mirrored) between compute nodes $116_1$, $116_2$, unmirrored, in which slots of high-speed memory $124_1$, $124_2$, are not replicated between compute nodes $116_1$, $116_2$, or No Policy (NoP) in which the dominant feature does not require a change to the current policy that is applied to the high-speed memories $124_1$, $124_2$. FIG. 5 shows an example workload feature/policy table 500 that is used, in some embodiments, as a lookup table. Based on the determined dominant feature for the workload cluster, a lookup is performed in the workload feature/policy table 500 to determine the policy that should be applied to the workloads represented by the workload cluster. In FIG. 5, the policies that apply when the respective feature is the dominant feature for a workload cluster are listed in the right-hand column. For example, if the dominant feature is "Total Writes" the policy that should be applied to the workload cluster is "Mirror". If the dominant feature is "Total Reads" the policy that should be applied to the workload cluster is "Unmirrored". If the dominant feature is "Average 'read' size", the mirror policy is "NOP" indicating that this dominant feature does not require a change to whatever policy is currently applied to the high-speed memory.

The percentage of total IOPS for the workload cluster is then determined, based on the number of IOPS for the workload cluster divided by total IOPS on the storage engine: Cluster % IOPS=Cluster IOPS/Total IOPS (block 1015). The workload cluster % IOPS represents the percentage workload performed by workloads that have been grouped into the workload cluster, as compared to the total amount of workload on the storage engine 118. The workload cluster % IOPS and determined policy for the workload cluster (mirrored, unmirrored, NOP) are then output (block 1020).

A determination is then made if there are more clusters (block 1025). If there are more clusters (a determination of YES at block 1025) the process returns to block 1000 where another of the workload clusters is selected. The process iterates until all clusters have been processed (a determination of NO at block 1025).

Clusters % IOPS are then aggregated per policy. For example, in some embodiments the control logic selects all clusters where the policy is "mirrored" and then adds the % IOPS for all clusters where the dominant workload feature was determined to be "mirrored". Similarly, the control logic aggregates the % IOPS for all unmirrored clusters. For example, if cluster 1 has a policy=mirrored, and % IOPS=23%, and cluster 4 has a policy=mirrored and % IOPS=12%, aggregating the IOPS on a per-policy basis results in mirrored policy % IOPS=35%. Similarly, if cluster 2 has a policy=unmirrored, and % IOPS=33%, and cluster 3 has a policy=unmirrored and % IOPS=17%, aggregating the IOPS on a per-policy basis results in unmirrored policy % IOPS=50%. Optionally, the outliers cluster may also be analyzed to determine if the dominant feature of the outliers indicates that the policy to be applied to the outliers cluster is mirrored, unmirrored, or NOP. Note—the mirrored % IOPS+unmirrored % IOPS does not need to add to 100%, since one or more of the workload clusters, which accounts for a finite amount of the % IOPS on the storage engine 118, may be associated with No Policy change (NOP).

As shown in FIG. 10, the policies applied to regions of the high-speed memory are adjusted based on the aggregated mirrored % IOPS and aggregated unmirrored % IOPS values determined at block 1030. The term "policy region" as that term is used herein, is used to refer to a region of the high-speed memory where a particular policy (mirrored or unmirrored) is applied. A given region of the high-speed memory will either have a "mirrored" policy applied to it or an "unmirrored" policy applied to it. A NOP policy indicates that the feature does not dictate a change to the current size of the policy regions that are implemented on the high-speed memory.

In some embodiments, the aggregated mirrored % IOPS and aggregated unmirrored % IOPS values are used to specify a respective minimum size of a mirrored policy region of the high-speed memories 124$_1$, 124$_2$, and a minimum size of an unmirrored policy region of the high-speed memories 124$_1$, 124$_2$ of the compute nodes 116$_1$, 116$_2$. For example, as shown in FIG. 10, the mirrored policy region of the high-speed memory 124 is adjusted to have a minimum size based on the aggregated mirrored % IOPS (block 1035). Similarly, the unmirrored policy region of the high-speed memory 124 is adjusted to have a minimum size based on the aggregated unmirrored % IOPS (block 1040).

For example, in the previous paragraph, the determined mirrored % IOPS=35%, and the determined unmirrored % IOPS=50%. These values specify the minimum amount of high-speed memory that should be included in each respective policy region. Specifically, based on these determined workloads, the high-speed memories should have a mirrored policy region that encompasses at least 35% of the high-speed memory, and an unmirrored policy region that encompasses at least 50% of the high-speed memory. If the policy regions of the high-speed memory do not meet these minimum values, the high-speed memory is adjusted such that the policies applied to the policy regions of the high-speed memory satisfy these minimum values.

For example, assume that the memory currently has a mirrored policy applied to 10% of the regions of high-speed memory, and an unmirrored policy applied to 90% of the regions of the high-speed memory. If the memory is adjusted to ensure that the mirrored policy region encompasses at least 35% of the high-speed memory, adjusting the memory will cause a policy change from unmirrored to mirrored on 25% of the high-speed memory such that, at the end of the adjustment, the high-speed memory will have a mirrored policy region=35% of the total memory, and an unmirrored policy region that encompasses the remaining 65% of the total high-speed memory.

As another example, assume that the memory currently has a mirrored policy applied to 50% of the regions and an unmirrored policy applied to 50% of the regions. In this instance, no change is required, because the current allocations of high-speed memory to the mirrored policy region and to the unmirrored policy region satisfy the minimum requirements determined from the workload cluster analysis.

In addition to determining the minimum size of the policy regions that should be implemented in the high-speed memory, in some embodiments the high-speed memory analysis and management engine 200 also determines a segmentation policy for each of the policy regions, the segmentation policy specifying a distribution of slot sizes that should be implemented within each of the policy regions.

Figure 11:
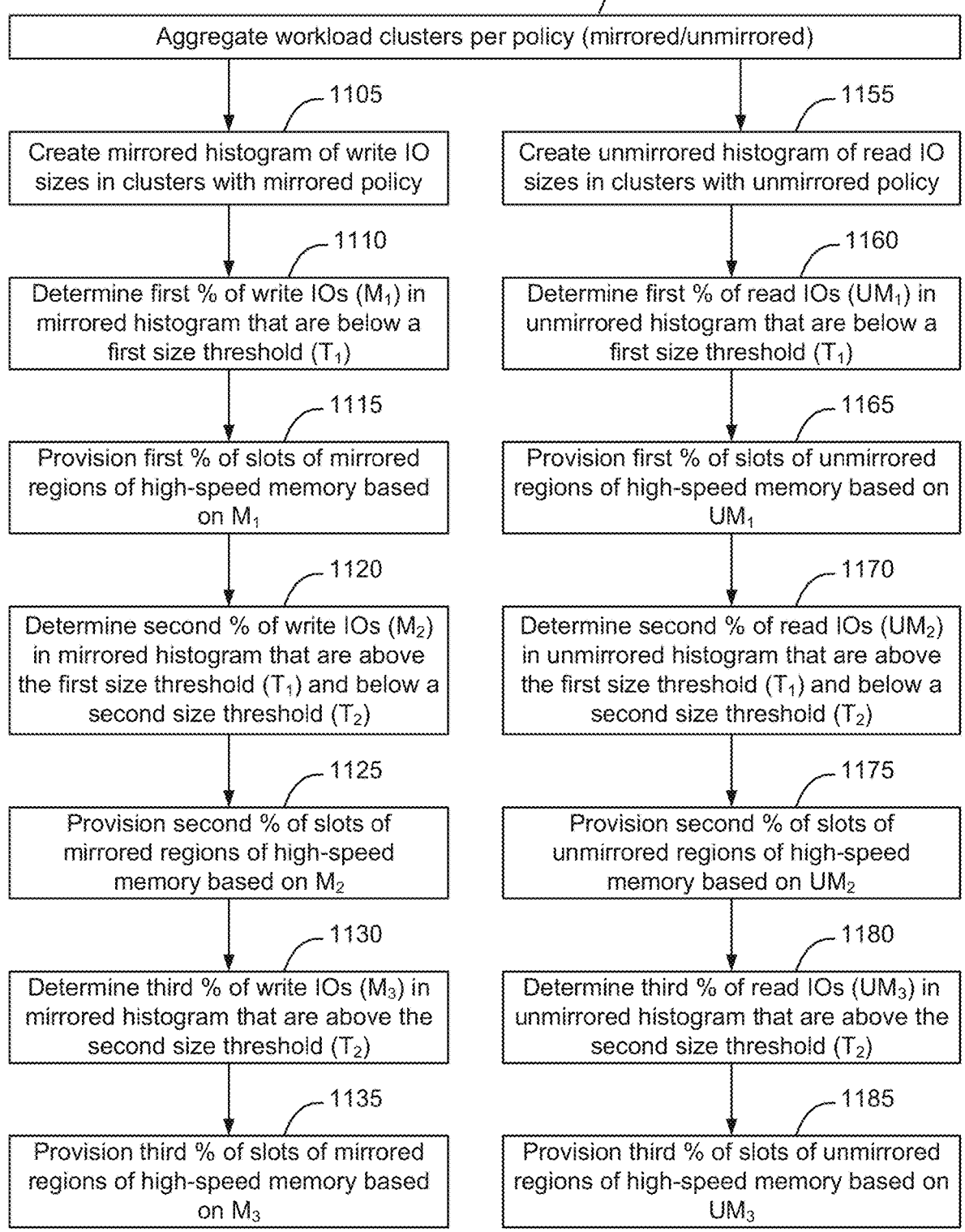
FIG. 11 is a flow chart of example control logic configured to determine segmentation size allocations for each of the policy regions of the high-speed memory, the segmentation size allocations defining the size of slots that are allocated from portions of the high-speed memory, according to some embodiments.

FIG. 11 is a flow chart of example control logic configured to determine segmentation size allocations for each of the policy regions of the high-speed memory, the segmentation size allocations defining the size of slots that can be allocated from the policy regions of the high-speed memory, according to some embodiments.

As shown in FIG. 11, in some embodiments, workload clusters are aggregated on a per-policy basis. Thus, if workload clusters 1 and 4 have dominant features associated with a mirrored policy, and workload clusters 2 and 3 have dominant features associated with an unmirrored policy, workload clusters 1 and 4 will be aggregated, and similarly workload clusters 2 and 3 will be aggregated.

Each of the set of workload clusters (per policy) is separately analyzed to independently determine the segmentation size that should be applied to the respective policy region. In FIG. 11, the left-hand column is used to determine a segmentation policy for the mirrored policy region of the high-speed memory, and the right-hand column is used to determine segmentation policy for the unmirrored policy region of the high-speed memory.

To determine a range of segmentation sizes for the mirrored policy region, a histogram of the number of IO operations for a set of IO size ranges is created, based on IO operations associated with workloads that were mapped to the workload clusters where the dominant workload feature maps to a mirrored policy (block 1105). A histogram, as that term is used herein, is a data structure correlating IO size (x axis) and number of IOs per unit IO size (y axis). For example, a histogram may divide IOs into size ranges of 10K increments. Any IO operations that occur within each of the increments is added to the histogram such that the y axis values indicate the number of IO operations that occurred that had a size within the respective size range.

In some embodiments, a mirrored policy is associated with write IOs. Accordingly, in some embodiments the histogram is created by determining the average 'write' size feature of each workload in the feature matrix that was mapped by the unsupervised clustering machine learning process to the workload clusters associated with a mirrored policy. The number of IOs that occurred on that workload is then added to the histogram entry for the histogram entry that encompasses the workload size. The histogram is built, in some embodiments, by determining the average write size of the workload, determining the number of IOs that occurred on the workload, and then adding that value to the respective entry of the histogram. At the end of processing all workloads that mapped to the mirrored policy clusters, the histogram will contain a distribution of IO operations based on IO size.

A similar histogram of IO sizes in clusters with an unmirrored policy is created (block 1155) based on average 'read' size features of each workload in the feature matrix that was mapped by the unsupervised clustering machine learning process to the workload clusters associated with an unmirrored policy, and the number of IO operations of the respective IO sizes.

In some embodiments, a segmentation policy specifies a distribution of segmentation size allocations defining the size of slots that can be allocated from the policy regions of the high-speed memory. In some embodiments, the segmentation policy specifies a limited number of fixed size slots that can be allocated from high-speed memory. For example, the segmentation policy might specify how much of each of the policy regions should be used in connection with allocating slots having 16K, 64K, and 128K sizes. Larger slot sizes are useful in connection with processing larger 10s, however for smaller IOs, using smaller slot sizes enables a larger number of slots to be allocated from the same amount of memory, thereby increasing the number of IOs that are able to be processed using the same amount of high-speed memory. Alternatively, reducing the slot size for a portion of the policy regions enables a smaller amount of high-speed memory to be used to support the same number of IO operations.

Although some embodiments are described in which the segmentation policy specifies the amount of each policy region that should be used to allocate slots having sizes of 16K, 64K, and 128K, it should be understood that other memory slot sizes might be used as well, depending on the implementation. Also, in FIG. 11, it is assumed that the slot sizes determined by the segmentation policy will be the same for both the unmirrored and the mirrored policy regions. It should be understood that different slot sizes might be used in the different policy regions, depending on the implementation.

As shown in FIG. 11, in some embodiments the segmentation analysis determines a first percentage of IOs ($M_1$) in the mirrored histogram that are below a first size threshold $T_1$ equal to the smallest slot size (block 1110). For example, if the smallest slot size is 16K, the segmentation analysis determines a first percentage of IOs in the mirrored histogram that had an average IO size smaller than 16K. The mirrored policy region of the high-speed memory is then configured such that the mirrored policy region includes at least $M_1$% of slots equal to the smallest slot size (block 1115).

The segmentation analysis also determines a second percentage of IOs ($M_2$) in the mirrored histogram that are above the first size threshold $T_1$ and below a second size threshold $T_2$ (block 1120). For example, if the smallest slot size is 16K, and the next larger slot size is 64K, the segmentation analysis determines a second percentage ($M_2$) of IOs in the mirrored histogram that had an average IO size larger than 16K and smaller than 64K. The mirrored policy region of the high-speed memory is then configured such that the mirrored policy region includes at least $M_2$% of slots equal to the second slot size (block 1125).

The segmentation analysis also determines a third percentage of IOs ($M_3$) in the mirrored histogram that are above the second size threshold $T_2$ (block 1130). For example, if the second size threshold is 64K, the segmentation analysis determines a third percentage ($M_3$) of IOs in the mirrored histogram that had an average IO size larger than 64K. The mirrored policy region of the high-speed memory is then configured such that the mirrored policy region includes at least $M_3$% of slots equal to the third slot size (block 1135).

A similar process is used to determine segmentation of the unmirrored policy region of the high-speed memory. Specifically, as shown in FIG. 11, in some embodiments the segmentation analysis determines a first percentage of IOs ($UM_1$) in the unmirrored histogram that are below a first size threshold $T_1$ equal to the smallest slot size (block 1160). For example, if the smallest slot size is 16K, the segmentation analysis determines a first percentage ($UM_1$) of IOs in the unmirrored histogram that had an average IO size smaller than 16K. The unmirrored policy region of the high-speed memory is then configured such that the unmirrored policy region includes at least $UM_1$% of slots equal to the smallest slot size (block 1165).

The segmentation analysis also determines a second percentage of IOs ($UM_2$) in the unmirrored histogram that are above the first size threshold $T_1$ and below the second size threshold $T_2$ (block 1170). For example, if the smallest slot size is 16K, and the next larger slot size is 64K, the segmentation analysis determines a second percentage ($UM_2$) of IOs in the unmirrored histogram that had an average IO size larger than 16K and smaller than 64K. The unmirrored policy region of the high-speed memory is then configured such that the unmirrored policy region includes at least $UM_2$% of slots equal to the second slot size (block 1175).

The segmentation analysis also determines a third percentage of IOs ($UM_3$) in the unmirrored histogram that are above the second size threshold $T_2$ (block 1180). For example, if the second size threshold is 64K, the segmentation analysis determines a third percentage of IOs ($UM_3$) in the unmirrored histogram that had an average IO size larger than 64K. The unmirrored policy region of the high-speed memory is then configured such that the unmirrored policy region includes at least $UM_3$% of slots equal to the third slot size (block 1185).

Figure 12:
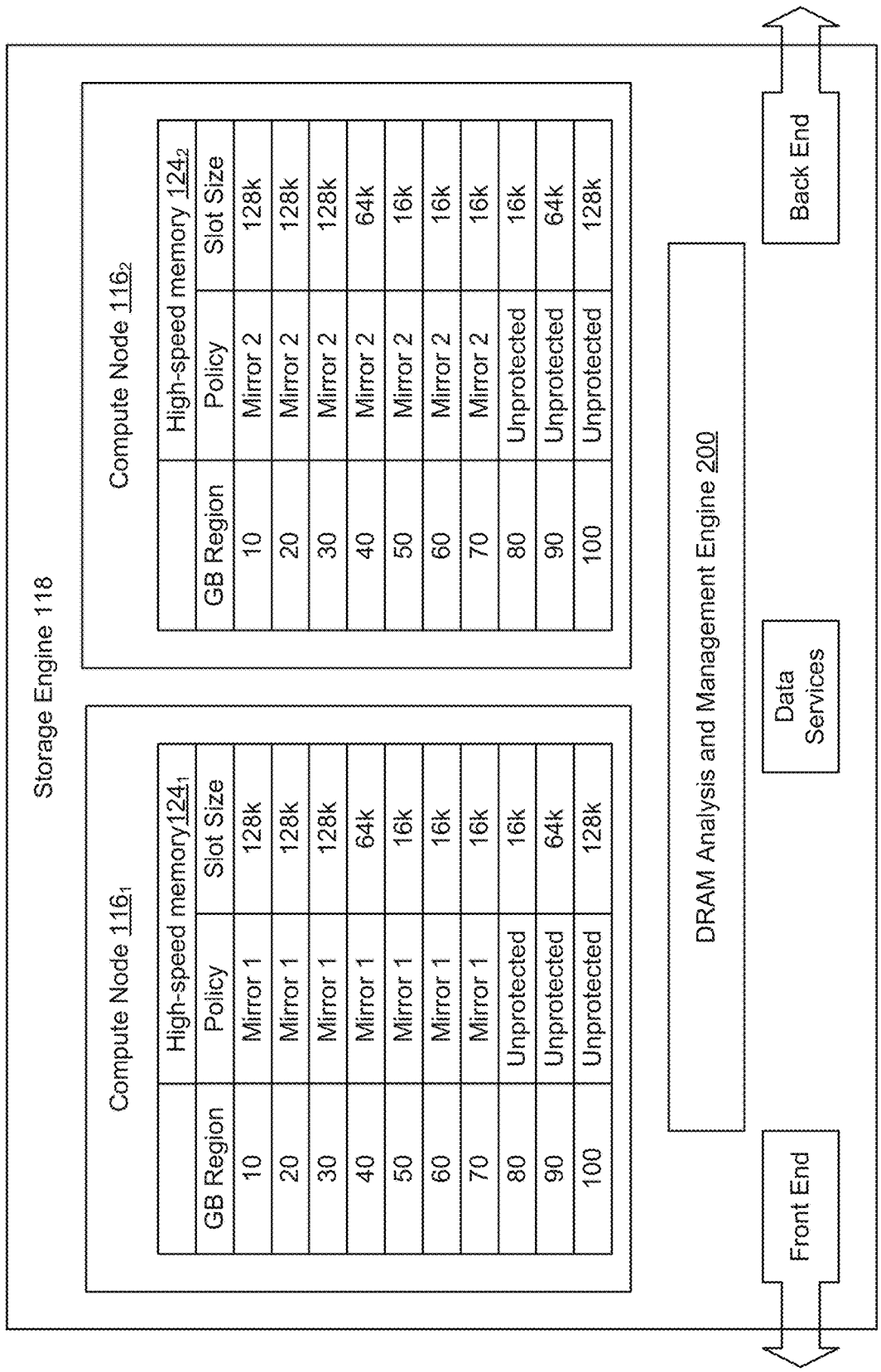
FIG. 12 is a functional block diagram of the storage engine of FIG. 2, after example policy region size adjustments have been implemented in the high-speed memory, and after adjusting segmentation size of the policy regions, according to some embodiments.

FIG. 12 is a functional block diagram of a storage engine of FIG. 2, after example adjustments to the size of policy regions have been implemented in the high-speed memory, and after adjusting segmentation size of the policy regions, according to some embodiments. Comparing FIG. 12 with FIG. 2, initially as shown in FIG. 2 the high-speed memory of compute nodes initially had a mirrored policy region that initially encompassed 90% of the high-speed memory, and an unmirrored policy region that initially encompassed 10% of the memory. Also, the initial segmentation policy that had been applied to the high-speed memory in FIG. 2 was to have uniform slot size segmentation throughout the high-memory, in that the slot size of all slots of high-speed memory was set to 128K. After performing a workload clustering process, it was determined (in this example) that the minimum size for the unmirrored policy region should be 30% of the high-speed memory. Accordingly, the size of the unmirrored policy region of the high-speed memory was increased from 10% (FIG. 2) to 30% (FIG. 12). The mirrored policy region accordingly was reduced from 90% to 70%. Additionally, based on the segmentation size analysis, a segmentation policy was determined that specified that 10G of the mirrored policy region should have a slot size of 64K, and that 30G of mirrored policy region of high-speed memory 124 should have a slot size of 16K. Likewise, segmentation analysis determined that the unmirrored policy region should have a first 10G region with a slot size of 16K, a second 10G region with a slot size of 64K, and a third 10G region with a slot size of 128K.

By reducing the amount of high-speed memory where the mirrored policy is applied, it is possible to enable a larger number of slots to be allocated from the high-speed memory of compute nodes $116_1$, $116_2$. Specifically, since allocation of a slot in a mirrored policy region requires a corresponding slot to be allocated in both high-speed memories $124_1$, $124_2$, of each compute node $116_1$, $116_2$, adjusting the size of the unmirrored and mirrored policy regions can dramatically affect the number of slots available for performing IOs by the storage engine. Additionally, adjusting the segmentation size can allow the use of smaller slot sizes for smaller IOs to thereby dramatically increase the number of slots that can be used to perform IOs in both the mirrored and unmirrored policy regions of the high-speed memory.

Changing the policy that is applied to a region of the high-speed affects the protection that is afforded data that is stored in the high-speed memory. For example, a mirrored policy provides data stored in the mirrored policy region with protection by causing a copy of the data to be redundantly stored in both high-speed memories $124_1$, $124_2$. An unmirrored policy, by contrast, does not provide this protection, since data that is stored in a slot of the unmirrored policy region is stored only in one of the two high-speed memories $124_1$ or $124_2$. Accordingly, changing the size of the policy regions should be implemented in a way that prevents loss of data, in the event of a failure of one of the compute nodes 116 during the high-speed memory reconfiguration process.

Figure 13:
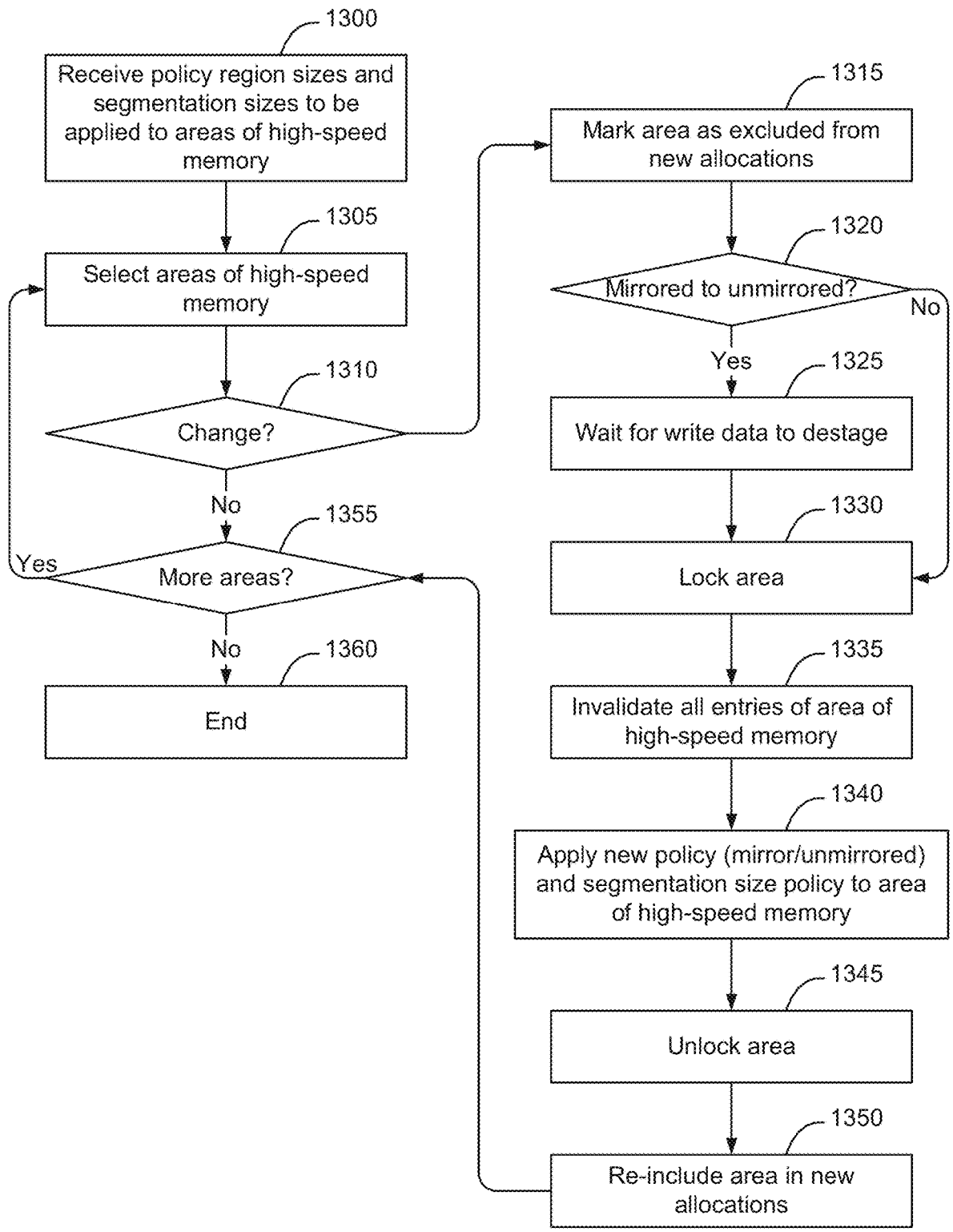
FIG. 13 is a flow chart of example control logic configured to adjust the size of policy regions of a high-speed memory and to apply new segmentation sizes to policy regions of a high-speed memory, according to some embodiments.

FIG. 13 is a flow chart of example control logic configured to apply new policy region sizes and segmentation policies to the high-speed memory, according to some embodiments. As shown in FIG. 13, when the high-speed memory analysis and management engine 200 receives a set of policies and segmentation size allocations to be applied to areas of high-speed memory (block 1300) an area of high-speed memory is selected (block 1305). A area in this context might be a physical range of memory addresses, such as a 10G area of high-speed memory, 1% of the size of the high-speed memory, or some other physical area of high-speed memory 124.

A determination is then made as to whether the policy (mirrored, unmirrored) or segmentation size that is currently applied to the region is required to be changed (block 1310). If there are no policy or segmentation size changes (a determination of NO at block 1310), the process determines whether there are more areas of high-speed memory to be processed (block 1355). If there are additional areas of high-speed memory (a determination of YES at block 1355) the process returns to block 1305 to select a subsequent area of high-speed memory (block 1305). Once all areas of high-speed memory are processed (a determination of NO at block 1355) the process ends (block 1360).

If it is determined that there is a policy change or a segmentation size change associated with the selected area of high-speed memory (a determination of YES at block 1310), the area is marked as exclude from new allocations (block 1315). Excluding the area from new allocations will prevent new data from being written to the selected area of the high-speed memory in connection with IO operations on the storage engine 118 during the reconfiguration process.

A determination is then made if there is a policy change that will cause the policy on the area of high-speed memory to change from mirrored (prior to policy change) to unmirrored (after policy change) (block 1320). If the area of high-speed memory currently has a mirrored policy, the data that is contained in the area is not stored in back-end storage resources 130 of the storage system 100, and instead is protected by mirroring within the high-speed memory 124. Accordingly, if the policy change is causing the area of high-speed memory to change from a mirrored policy to an unmirrored policy (a determination of YES at block 1320) the process of implementing the policy change on the area of high-speed memory waits for all write data in the area to destage (block 1325). The term "destage" in this context means to be written from high-speed memory to back-end storage resources 130 of the storage system 100.

Once the data has destaged (after block 1325), or if the policy change does not involve a change from mirrored to unmirrored (a determination of NO at block 1320) the area is locked (block 1330). All entries of the area of high-speed memory are invalidated (block 1335) and the new policy (mirror or unmirror) and segmentation size rules are applied to the area of high-speed memory (block 1340). The area is then unlocked (block 1345) and the area is re-included in all new allocations (block 1350) to enable slots of the area of high-speed memory to be used in connection with processing subsequent IO operations on the storage engine 118. The process then returns to block 1355 to determine if there are additional areas of high-speed memory to be processed.

Changing the policy applied to areas of high-speed memory can be disruptive. For example, as noted in connection with block 1315, some policy changes require the area to be marked as excluded from new allocations pending destage of all current entries, before the new policy and segmentation size is able to be applied to the area of high-speed memory. Accordingly, in some embodiments, areas of high-speed memory are serially processed such that policy changes and segmentation size changes are implemented on small areas of the high-speed memory over time to minimize the disruption associated with reconfiguring the policy regions of the high-speed memory.

Periodically, the unsupervised clustering machine learning process may be used to readjust policy regions of the high-speed memory and the segmentation used within the policy regions to specify the allocations of slot sizes within the policy regions. FIG. 14 is a flow chart of example control logic configured to periodically determine a new set of policies to be applied to areas of high-speed memory, according to some embodiments.

As shown in FIG. 14, it is assumed that a current set of policies is applied to the high-speed memory to set minimum sizes of the policy regions and segmentation sizes for the policy regions (block 1400). While the current set of mirrored/unmirrored policies and segmentation rules are applied to the high-speed memory, IO traces are captured and aggregated to form a feature matrix (See FIG. 7) (block 1405).

There are several reasons to perform clustering analysis of the feature matrix. For example, the performance of the high-speed memory 124 may be monitored to determine whether the performance has degraded over time (block 1410). A reduction in performance of the high-speed memory may be caused by a change in workload over time. A high-speed memory having a set of policy regions based on a set of previous workloads may not be optimized for the current set of workloads being handled by the storage engine. Likewise, the current segmentation size may be suboptimal for current set of workloads being handled by the storage engine. Accordingly, a determination may be made if the performance of the high-speed memory has been reduced by a particular threshold T (block 1415). If it is determined that the performance of the high-speed memory has been reduced (a determination of YES at block 1415) the unsupervised clustering machine learning process described herein may be responsively run on the most recent feature matrix (block 1420).

In some embodiments, the unsupervised clustering machine learning process described herein is run periodically, for example daily, weekly, or on some other time-based basis (block 1435). By periodically using the unsupervised clustering machine learning process on the most recent feature matrix, it is possible to determine whether changes to the policy regions should be implemented or whether changes to segmentation should be implemented within the high-speed memory. In some embodiments, the unsupervised clustering machine learning process described herein can also be run manually, on demand, for example in response to a command received from a storage system management application (block 1430).

Whenever a determination is made that the unsupervised clustering machine learning process should be implemented, the unsupervised clustering machine learning process described herein is used to determine a new set of policies to be applied to the areas of the high-speed memory (block 1435). After using the unsupervised clustering machine learning process to determine the minimum size of the policy regions and the segmentation size to be applied to the policy regions, a determination is made as to whether the size of the policy regions and segmentation size are different than the previous size of the policy regions and segmentation sizes (block 1440). If there are differences (a determination of YES at block 1440), the new set of policies and segmentation sizes are applied to the areas of the high-speed memory (block 1445).

In some embodiments, since changing the policy applied to a portion of the high-speed memory is disruptive, the difference determined in block 1440 should be larger than a given threshold before the new policies and/or segmentation sizes are applied to the high-speed memory.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining policies to be applied to policy regions of high-speed memory of a storage engine, comprising:
    collecting IO traces describing IO operations on a high-speed memory of a storage engine, the IO operations relating to read and write operations on multiple storage volumes;
    processing the IO traces to extracting workload features on a per-storage volume basis, the features describing the workloads on the storage volumes;
    fitting an unsupervised clustering machine learning process to the workload features to create a set of workload clusters;
    determining a respective dominant feature of each of the workload clusters;
    determining a policy associated with each respective dominant feature;
    grouping workload clusters based on commonality of policies to form a first set of mirrored policy workload clusters and a second set of unmirrored policy workload clusters;
    determining a first aggregated percentage IOPS for the first set of mirrored policy workload clusters;
    determining a second aggregated percentage IOPS for the second set of unmirrored policy workload clusters;
    using the determined first aggregated percentage IOPS to set a minimum size of a mirrored policy region in the high-speed memory;
    using the determined second aggregated percentage IOPS to set a minimum size of an unmirrored policy region in the high-speed memory; and
    adjusting the policies applied to areas of the high-speed memory based on the minimum size of the mirrored policy region and the minimum size of the unmirrored policy region.

2. The method of claim 1, wherein the unsupervised clustering machine learning process is an Hierarchical Density-Based Spatial Clustering of Applications with Noise (HDBSCAN) unsupervised clustering machine learning process.

3. The method of claim 2, wherein the step of fitting the unsupervised clustering machine learning process comprises creating a set of four workload clusters and one outliers cluster.

4. The method of claim 1, wherein the mirrored policy region is a region of high-speed memory in which each slot allocated from the high-speed memory in the mirrored policy region is mirrored with a second slot allocated from the high-speed memory; and wherein the unmirrored policy region is a region of high-speed memory in which each slot allocated from the high-speed memory in the unmirrored policy region is not mirrored with a second slot allocated from the high-speed memory.

5. The method of claim 1, further comprising setting a first segmentation policy for the mirrored policy region and setting a second segmentation policy for the unmirrored policy region.

6. The method of claim 5, wherein setting the first segmentation policy for the mirrored policy region comprises:

determining a distribution of write IO sizes of workloads included the first set of mirrored policy workload clusters; and specifying slot sizes for areas of the mirrored policy region based on the distribution of write IO sizes; and wherein setting the second segmentation policy for the unmirrored policy region comprises:

determining a distribution of read IO sizes of workloads included the first set of mirrored policy workload clusters; and specifying slot sizes for areas of the mirrored policy region based on the distribution of read IO sizes.

7. The method of claim 1, wherein the policy associated with each respective dominant feature is either mirrored, unmirrored, or no policy change (NoP).

8. The method of claim 1, wherein IO operations on a particular storage volume comprises a workload, and wherein each workload cluster is a set of workloads on a respective set of storage volumes.

9. The method of claim 8, wherein the first aggregated percentage IOPS for the first set of mirrored policy workload clusters is based on a number of IOPS of the set of workloads in the first set of mirrored policy workload clusters compared to a total 10P5 on all workloads.

10. The method of claim 1, wherein adjusting the policies applied to areas of the high-speed memory comprises:

selecting an area of the high-speed memory;

marking the area as excluded from new allocations;

determining if a policy change is being implemented to change the policy that is applied to the selected area from mirrored to unmirrored; and when the policy change that is to be applied will change the policy to change from mirrored to unmirrored, waiting for all data currently stored in the selected area to destage to back-end storage resources.

11. A non-transitory tangible computer readable storage medium having stored thereon a computer program for determining policies to be applied to policy regions of high-speed memory of a storage engine, the computer program including a set of instructions which, when executed by a computer, cause the computer to perform a method comprising the steps of:

collecting IO traces describing IO operations on a high-speed memory of a storage engine, the IO operations relating to read and write operations on multiple storage volumes;

processing the IO traces to extracting workload features on a per-storage volume basis, the features describing the workloads on the storage volumes;

fitting an unsupervised clustering machine learning process to the workload features to create a set of workload clusters;

determining a respective dominant feature of each of the workload clusters;

determining a policy associated with each respective dominant feature;

grouping workload clusters based on commonality of policies to form a first set of mirrored policy workload clusters and a second set of unmirrored policy workload clusters;

determining a first aggregated percentage IOPS for the first set of mirrored policy workload clusters;

determining a second aggregated percentage IOPS for the second set of unmirrored policy workload clusters;

using the determined first aggregated percentage IOPS to set a minimum size of a mirrored policy region in the high-speed memory;

using the determined second aggregated percentage IOPS to set a minimum size of an unmirrored policy region in the high-speed memory; and adjusting the policies applied to areas of the high-speed memory based on the minimum size of the mirrored policy region and the minimum size of the unmirrored policy region.

12. The non-transitory tangible computer readable storage medium of claim 11, wherein the unsupervised clustering machine learning process is an Hierarchical Density-Based Spatial Clustering of Applications with Noise (HDBSCAN) unsupervised clustering machine learning process.

13. The non-transitory tangible computer readable storage medium of claim 12, wherein the step of fitting the unsupervised clustering machine learning process comprises creating a set of four workload clusters and one outliers cluster.

14. The non-transitory tangible computer readable storage medium of claim 11, wherein the mirrored policy region is a region of high-speed memory in which each slot allocated from the high-speed memory in the mirrored policy region is mirrored with a second slot allocated from the high-speed memory; and wherein the unmirrored policy region is a region of high-speed memory in which each slot allocated from the high-speed memory in the unmirrored policy region is not mirrored with a second slot allocated from the high-speed memory.

15. The non-transitory tangible computer readable storage medium of claim 11, further comprising setting a first segmentation policy for the mirrored policy region and setting a second segmentation policy for the unmirrored policy region.

16. The non-transitory tangible computer readable storage medium of claim 15, wherein setting the first segmentation policy for the mirrored policy region comprises:

determining a distribution of write IO sizes of workloads included the first set of mirrored policy workload clusters; and specifying slot sizes for areas of the mirrored policy region based on the distribution of write IO sizes; and wherein setting the second segmentation policy for the unmirrored policy region comprises:

determining a distribution of read IO sizes of workloads included the first set of mirrored policy workload clusters; and specifying slot sizes for areas of the mirrored policy region based on the distribution of read IO sizes.

17. The non-transitory tangible computer readable storage medium of claim 11, wherein the policy associated with each respective dominant feature is either mirrored, unmirrored, or no policy change (NoP).

18. The non-transitory tangible computer readable storage medium of claim 11, wherein IO operations on a particular storage volume comprises a workload, and wherein each workload cluster is a set of workloads on a respective set of storage volumes.

19. The non-transitory tangible computer readable storage medium of claim 18, wherein the first aggregated percentage IOPS for the first set of mirrored policy workload clusters is based on a number of IOPS of the set of workloads in the first set of mirrored policy workload clusters compared to a total IOPS on all workloads.

20. The non-transitory tangible computer readable storage medium of claim 11, wherein adjusting the policies applied to areas of the high-speed memory comprises:
- selecting an area of the high-speed memory;
- marking the area as excluded from new allocations;
- determining if a policy change is being implemented to change the policy that is applied to the selected area from mirrored to unmirrored; and
- when the policy change that is to be applied will change the policy to change from mirrored to unmirrored, waiting for all data currently stored in the selected area to destage to back-end storage resources.

* * * * *